United States Patent
Togami et al.

(10) Patent No.: US 6,668,113 B2
(45) Date of Patent: Dec. 23, 2003

(54) COMPACT OPTICAL ASSEMBLY FOR OPTOELECTRONIC TRANSCEIVERS

(75) Inventors: Chris K. Togami, San Jose, CA (US); Paul K. Rosenberg, Sunnyvale, CA (US); Jan Lipson, Cupertino, CA (US); Lewis B. Aronson, Los Altos, CA (US)

(73) Assignee: Finisar Corporation, Sunnyvale, CA (US)

(*) Notice: Subject to any disclaimer, the term of this patent is extended or adjusted under 35 U.S.C. 154(b) by 200 days.

(21) Appl. No.: 09/957,557

(22) Filed: Sep. 19, 2001

(65) Prior Publication Data

US 2003/0053222 A1 Mar. 20, 2003

(51) Int. Cl.$^7$ ............................. G02B 6/32; H04B 10/00
(52) U.S. Cl. .............................. 385/33; 385/31; 385/35; 385/73; 385/74; 385/88; 385/89; 385/92; 385/93; 398/135; 398/140; 398/141
(58) Field of Search .............................. 385/31, 33, 34, 385/35, 88, 89, 73, 74, 92, 93; 398/135, 140, 141

(56) References Cited

U.S. PATENT DOCUMENTS

| | | | | |
|---|---|---|---|---|
| 4,211,469 A | * | 7/1980 | Holzman | 385/47 |
| 6,064,417 A | * | 5/2000 | Harrigan et al. | 347/232 |
| 6,213,651 B1 | * | 4/2001 | Jiang et al. | 385/92 |
| 6,328,484 B1 | * | 12/2001 | Uebbing | 385/93 |

OTHER PUBLICATIONS

Dair et. al., "Method and Apparatus for Multiboard Fiber Optic Module.." U.S. patent application Publication No. U.S. 2002/0030872A1, published Mar. 14, 2002.*
Jian, "Vertically Integrated Optical Devices . . . "; U.S. patent application Publication No. U.S. 2003/0002809 A1, published Jan. 2, 2003.*
Togami et. al., "Compact Optical Assembly . . . "; U.S. patent application Publication No. U.S. 2003/0053222A1, published Mar. 20, 2003.*

* cited by examiner

Primary Examiner—Brian Healy
(74) Attorney, Agent, or Firm—Workman Nydegger

(57) ABSTRACT

An optical assembly includes a first lens positioned along a first axis and configured to focus light from a light source along the first axis, and a second lens positioned along the first axis and configured to focus light from the first lens onto an optical target. A third lens is positioned along a second axis and configured to approximately collimate light from a second light source along the second axis, and a reflector positioned along the second axis is configured to reflect light from the third lens onto a fourth lens. The fourth lens is positioned on a third axis angled from the second axis and configured to focus light from the reflector onto an optical detector. Furthermore, the optical assembly is preferably a single molded optic. The optical assembly may be used in an optoelectronic transceiver having an optical subassembly, including a light source and an optical detector. The optical assembly is used to couple a pair of closely spaced optical fibers to the light source and optical detector.

33 Claims, 6 Drawing Sheets

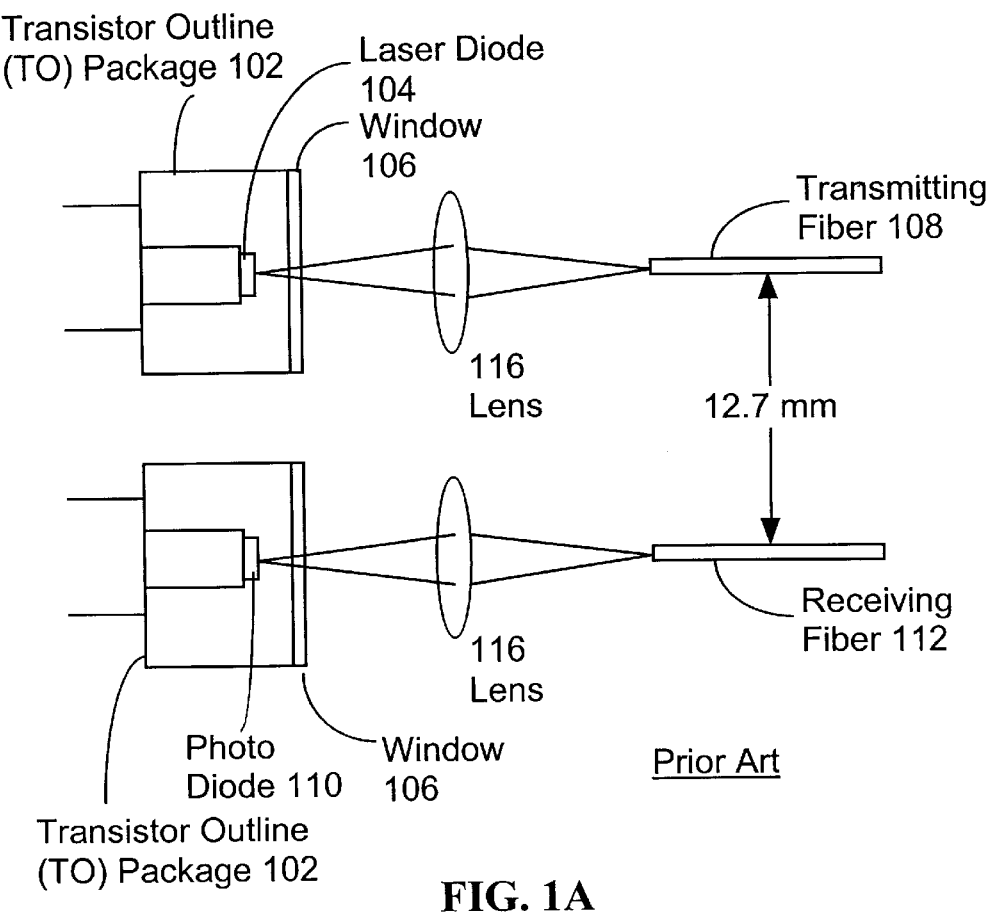
FIG. 1A *Prior Art*
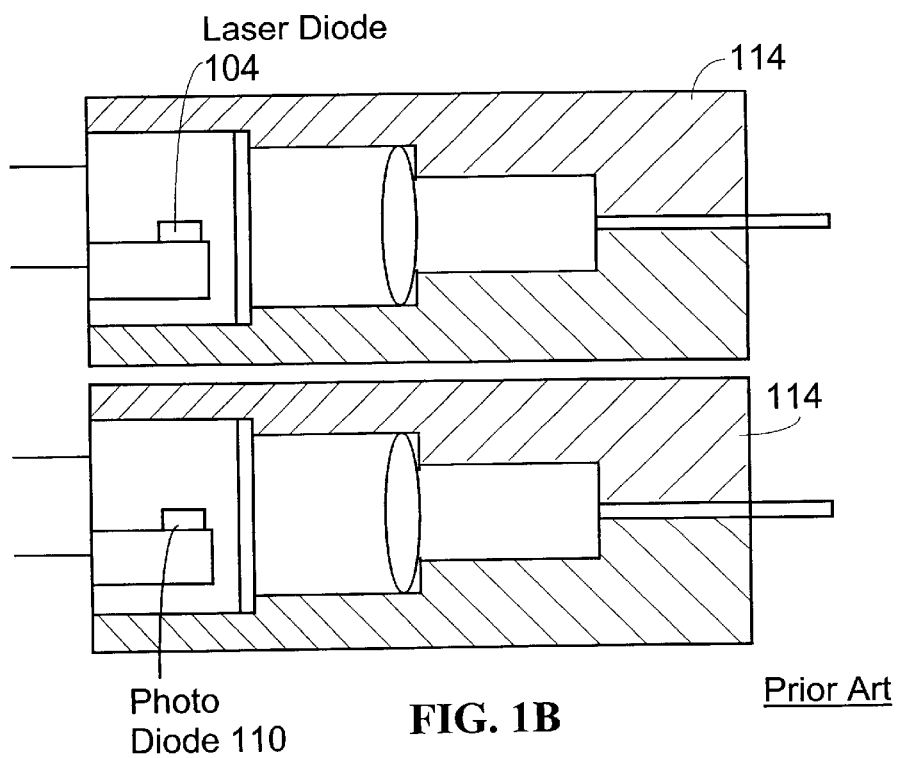
FIG. 1B *Prior Art*

COMPACT OPTICAL ASSEMBLY FOR OPTOELECTRONIC TRANSCEIVERS

The present invention relates generally to optoelectronic transceivers, and particularly to optical assemblies within the optoelectronic transceivers that allow the optical fibers to be spaced very close to each other.

BACKGROUND OF THE INVENTION

One of the emerging standards in data communications and telecommunications uses a family of connectors called MT-RJ which have a pair of very closely spaced optical fibers. In particular, these connectors have a 0.75 mm (which may also be expressed as 750 μm) fiber pitch, which means that the centers of the two fibers in these connectors are 0.75 mm apart, within a tolerance of about ±5 μm for multimode applications and about ±1 μm for single mode applications.

The transistor outline (TO) packages (sometimes called TO cans) in which most optical sources (e.g., laser diodes) and optical detectors (i.e., photodiodes) are housed have a diameter of at least 5 mm, and these TO packages are furthermore often embedded in mechanical port assemblies that provide for the mechanical alignment of the TO packages. These mechanical port assemblies are usually substantially larger than the TO packages. Each optical element (e.g., laser diode or photodiode) in its TO package housing (which may or may not include a port assembly as well) is herein called an optical subassembly. The optical subassembly containing a laser diode is sometimes called a transmitter optical subassembly and the optical subassembly containing a photodiode is sometimes called a receiver optical subassembly. In order to provide a pair of parallel, straight optical paths between a pair of optical fibers and a pair of optical subassemblies the distance between the optical fibers must be the same as the distance between the optical elements, which in turn is limited by the width of the optical subassemblies. For optoelectronic transceivers using SC duplex optical connectors, the fiber pitch at the interface to the transceiver is 12.7 mm, or more than ten times the fiber pitch presented by MT-RJ connectors.

Referring to FIGS. 1A and 1B, there is shown an embodiment of a prior art optical assembly of an optoelectronic transceiver using standard TO header based packages 114 (i.e., the TO packages 102 are embedded in port assemblies) and a pair of optical fibers 108, 112 that are coupled to the transceiver by an SC duplex connector (not shown). The laser diode 104 and the photo diode 110 are each housed in a standard TO package 102 having a window 106. The laser diode 104 transmits an optical signal to the transmitting fiber 108 and the photodiode 110 receives an optical signal from the receiving fiber 112. A focusing lens 116 is positioned in each of the two optical paths. In the configuration shown in FIGS. 1A and 1B, the transmitting fiber 108 and the receiving fiber 112 are about 12.7 mm apart at the connector interface. In other configurations, when the two TO packages 102 are spaced together as closely as possible, the transmitting fiber 108 and the receiving fiber 112 are no closer than 5 mm apart at the connector interface.

Due to the relatively large diameters of standard optical subassemblies, the pair of optical fibers at the interface of a transceiver in which the transmitter and receiver optical subassemblies are placed side by side must be at least 5 mm apart, and typically must be even further apart (e.g., at least 10 mm apart). Thus, it would seem that in order to couple the fibers in an MT-RJ connector to the optical subassemblies of an optoelectronic transceiver, a new optical element housing might be devised for the optical subassemblies to enable the laser and photodiode elements to be positioned the same distance from each other as the fiber pitch of the MT-RJ connector. Alternatively, a single optical subassembly containing both the optical source and detector elements separated by 0.75 mm might be used. However, these approaches to coupling the pair of fibers in an MT-RJ connector to a pair of optical subassemblies are less than optimal. The electromagnetic fields associated with the electrical connections of the transmitter and receiver elements will tend to interfere with each other when they are close to each other (e.g., within 1 mm of each other), resulting in electrical crosstalk between the transmitter and receiver signals. Also, changing the optical element housing might require the use of higher precision, and thus more expensive, housing components. Finally, devices packaged in TO packages are presently in widespread use and may therefore be considerably less expensive than customized packaging solutions.

SUMMARY OF THE INVENTION

In summary, the present invention is an optical assembly that includes a first lens positioned along a first axis and configured to approximately collimate light from a light source along the first axis, and a second lens positioned along the first axis and configured to focus light from the first lens onto an optical target. Also, there is a third lens positioned along a second axis and configured to approximately collimate light from a second light source along the second axis. A reflector positioned along the second axis is configured to reflect light from the third lens onto a fourth lens, which is positioned on a third axis angled from the second axis and configured to focus light from the reflector onto an optical detector. Furthermore, the optical assembly is a single molded optic.

Another aspect of the present invention is an optoelectronic transceiver having an optical subassembly and the aforementioned optical assembly. The optical subassembly includes a light source and an optical detector.

The present invention minimizes electrical cross talk between the transmitter and receiver signals flowing through an optoelectronic transmitter while allowing the optical fibers to be spaced very close together. More importantly, the present invention provides simple optical paths between the optical elements and optical fibers, with no reflections in the transmitter optical path and only a single reflection in the receiver optical path.

BRIEF DESCRIPTION OF THE DRAWINGS

Additional objects and features of the invention will be more readily apparent from the following detailed description and appended claims when taken in conjunction with the drawings, in which:

FIGS. 1A and 1B depict an embodiment of a prior art optical assembly.

DESCRIPTION OF THE PREFERRED EMBODIMENTS

Figure 2:
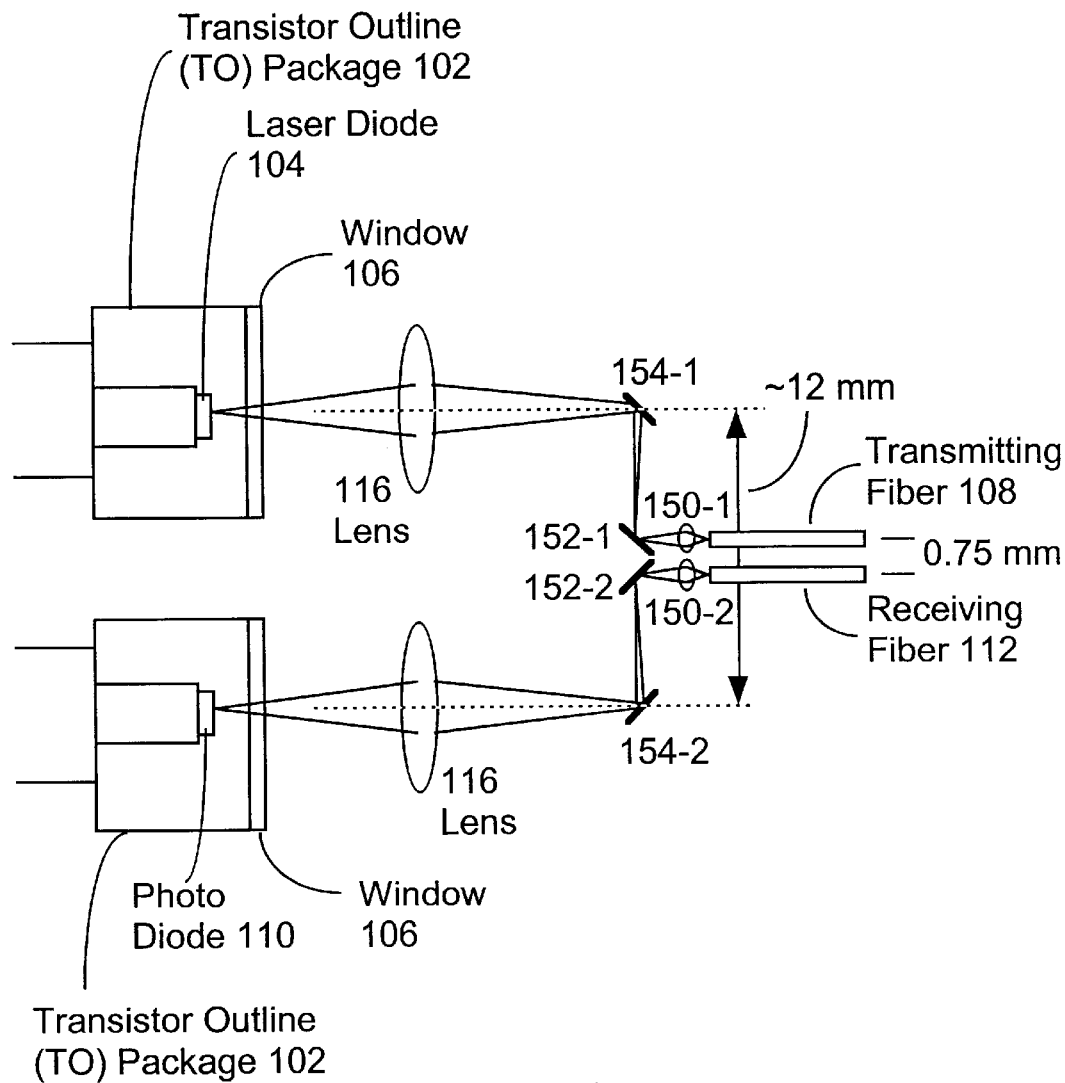
FIG. 2 depicts an optical assembly using four reflectors to adapt the optical paths of the pair of fibers in an MT-RJ connector to the optical paths of a pair of parallel optical elements.
Figure 2A:
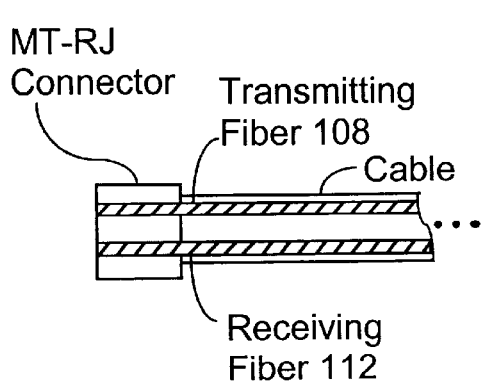
FIG. 2A schematically depicts an MT-RJ connector.

FIG. 2 shows one possible apparatus for coupling a pair of optical fibers 108, 112 presented by an MT-RJ connector (FIG. 2A) to a pair of optical subassemblies having TO package housings. A laser diode 104 and photo diode 110 are each housed in a standard TO package 102 having a window 106. The laser diode 104 transmits an optical signal to the transmitting fiber 108 and the photodiode 110 receives an optical signal from the receiving fiber 112. A focusing lens 116 is positioned in each of the two optical paths. While FIG. 2A shows the two optical fibers 110, 112 inside an MT-RJ connector and the associated optical fiber cable, in practice the optical fibers are not visible during normal use because they are positioned inside the opaque housing of the MT-RJ connector and inside an opaque cable cover and/or plastic coating protecting the length of the optical fibers.

As explained above, at the interface of the connector the centers of the two fibers are spaced 0.75 mm apart. In this apparatus, four 90 degree reflectors 152-1, 152-2, 154-1, 154-2 are used to translate the optical paths of the optical fibers 108, 112 from their initial paths to two parallel paths, each displaced approximately 5 to 6 mm from the respective initial path. Optionally, additional lenses 150-1, 150-2 may be used to focus and collimate the optical beams so as to compensate for the increase in the length of the optical paths traveled by the optical beams.

Figure 2B:
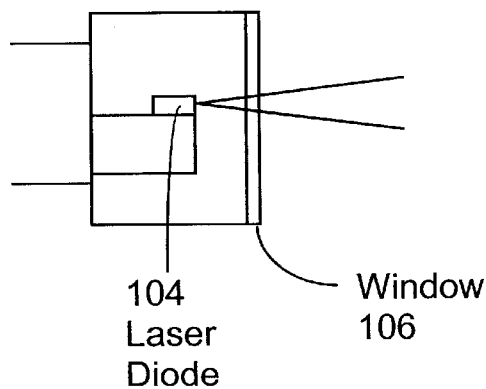
FIG. 2B depicts a transistor outline package containing an edge emitting laser diode.

The laser diode 104 may be any suitable laser device, such as an edge emitter (FIG. 2B) or a surface emitter type (e.g., VCSEL, vertical cavity surface emitting laser) of laser (FIG. 2).

Figure 3:
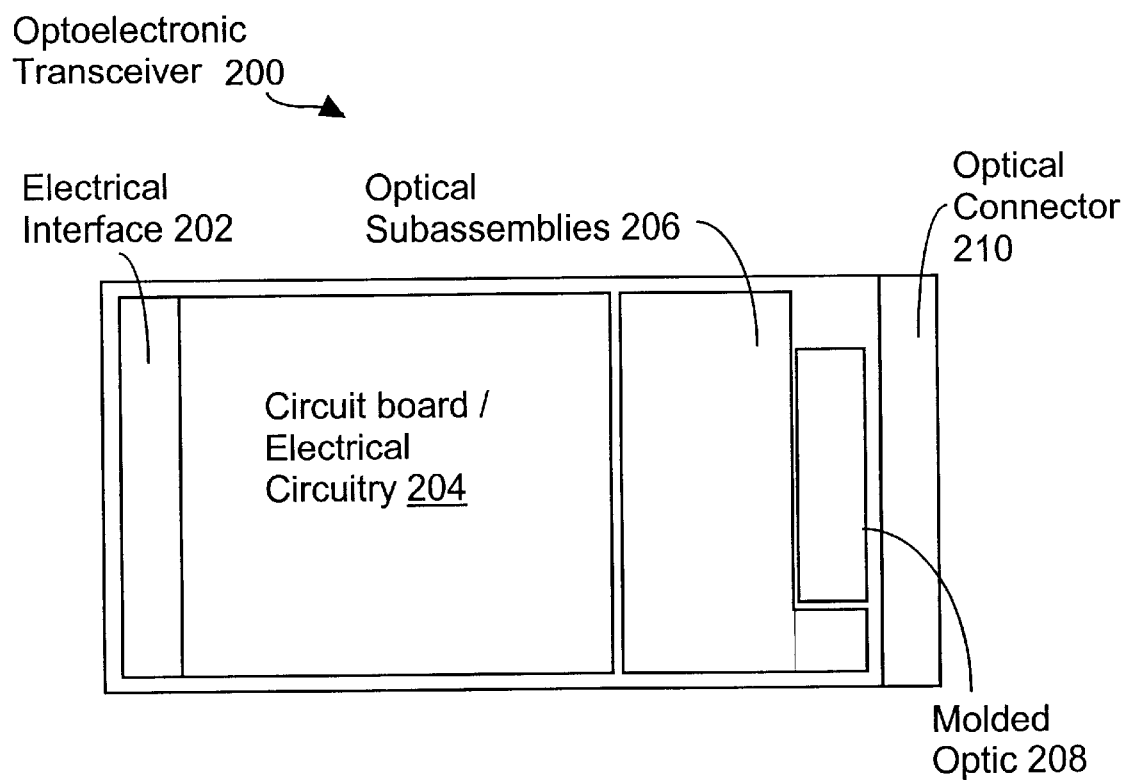
FIG. 3 depicts an embodiment of an optoelectronic transceiver in accordance with the present invention.

Referring to FIG. 3, there is shown an embodiment of an optoelectronic transceiver 200 in accordance with the present invention. The optical connector 210 connects the transceiver to the optical fibers. The optical subassemblies 206 detect the optical signals on the receiving optical fiber, and transmit optical signals to the transmitting optical fiber 108 (FIG. 2). The optical subassemblies 206 furthermore convert optical signals received from the receiving optical fiber 112 (FIGS. 1A, 2) into electrical signals, and convert electrical signals received from the electrical circuitry 204 into optical signals for transmission over the transmitting optical fiber 108 (FIGS. 1A, 2).

The molded optic 208 focuses the transmitted optical signal onto the transmitting optical fiber, and focuses the received optical signal onto the optical detector. The molded optic 208 in accordance with the present invention permits the use of an optical connecter 210 in which the two optical fibers (one for transmitting and one for receiving) are spaced very close to each other and centered with respect to the overall optical subassembly and transceiver body.

The electrical circuitry 204 amplifies and processes the electrical signals being transmitted between the optical subassemblies 206 and the electrical interface. Circuitry 204 typically includes a laser driver circuit that accepts high speed digital data and electrically drives an LED or laser diode to create optical pulses, and a receiver circuit that receives relatively small signals from an optical detector and amplifies and limits them to create a uniform amplitude (i.e., fixed output swing) digital electronic output signal.

Finally, the electrical interface 202 sends the electrical signals to a device, such as a router or computer or other electrical or electronic device, and receives electrical signals from the device which are to be converted into optical signals.

Figure 4:
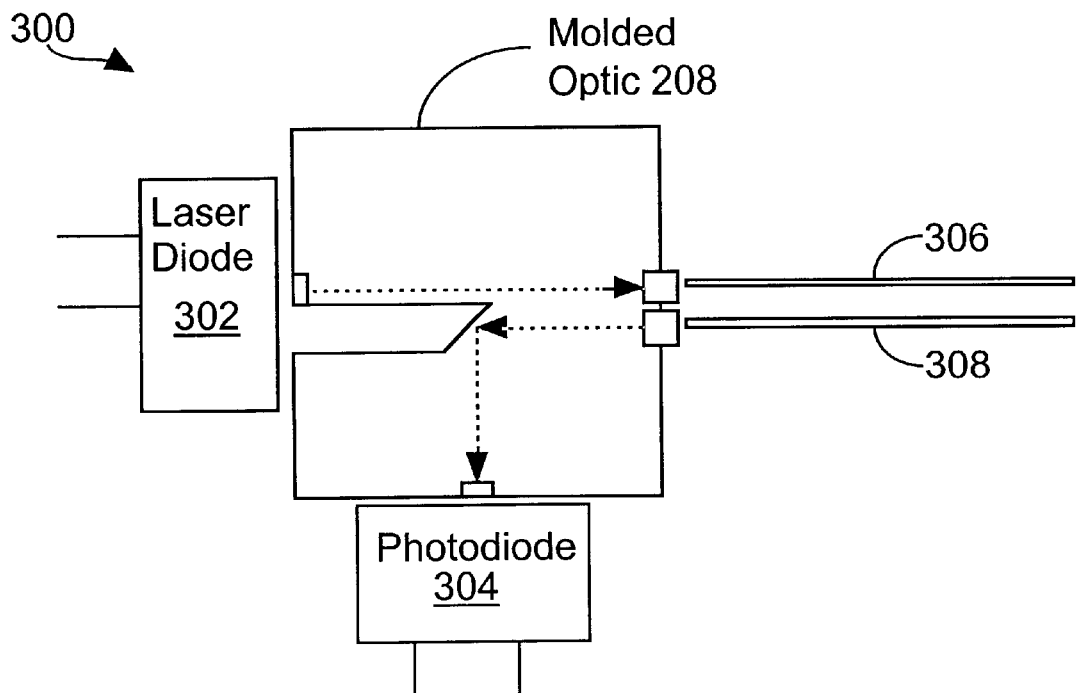
FIG. 4 depicts an embodiment of a molded optic and optical subassemblies in accordance with the present invention.

Referring to FIG. 4, there is shown an embodiment of an optical assembly 300, including a molded optic 208 in accordance with the present invention. The optical assembly 300 includes a transmitter, such as laser diode 302, and a receiver, such as photodiode 304. The laser diode 302 is positioned so that the laser beam generated by the laser diode 302 travels straight through the molded optic 208 and is focused onto the transmitting fiber 306. Thus, the outbound optical path is essentially straight, with no bends. A second laser beam is received from the receiving fiber 208 and is redirected perpendicularly through the molded optic 208 onto the photodiode 304.

This design has two main advantages. First, it allows the transmitting fiber 306 and the receiving fiber 208 to be positioned very close to each other. As a result, an MT-RJ fiber optic connector, which holds the transmission fiber 306 and receiving fiber 308 approximately 0.75 mm apart from each other, can be used in conjunction with the transceiver because it is no longer necessary to position the optical fibers 306 and 308 so as to accommodate the relatively large size of the TO packaging of the laser diode and the photodiode.

Second, the optical paths are very simple. The laser from the laser diode 302 is not bent, and as a result it can be focused very precisely onto the transmitting fiber 306. The light from the receiving fiber 308 is bent only once before it is focused onto the photodiode 304. The core of the transmitting fiber 306 is small, typically 50 to 62.5 $\mu$m in diameter, and therefore it is important that the light from the laser diode 302 is precisely focused onto the core of the transmitting fiber 306. The active area of the photodiode 304, which can be up to 200 $\mu$m in diameter (or up to a 200 $\mu$m by 200 $\mu$m square region), is much larger than the core of a typical optical fiber. As a result, the inbound light from the receiving fiber 308 does not need to be focused as precisely as the outbound light from the laser diode. Therefore it is optimal to bend the light from the receiving fiber 308, rather than the light from the laser diode 302. Furthermore, it is better to bend the light from the receiving fiber only once, rather than twice—as in the apparatus shown in FIG. 2. Each additional bend makes the precision of each reflector's position and angle of orientation more critical, and thus increases the difficulty and cost of developing the optical components coupling the optical connector to the 210 to the optical subassemblies 206.

Additionally, the positioning and perpendicular orientation of the photodiode with respect to the laser diode results in very low electrical crosstalk.

In alternate embodiments the reflector 410 (FIG. 5) maybe angled so as to bend the inbound light at angles other than 90 degrees. For example, it may be advantageous to configure (i.e., size and orient) the reflector 410 so as to redirect the received light at an angle of anywhere from 30 to 150 degrees relative to the initial path of the inbound light from the receiving fiber 308, depending upon the housing constraints of the transceiver.

Figure 5:
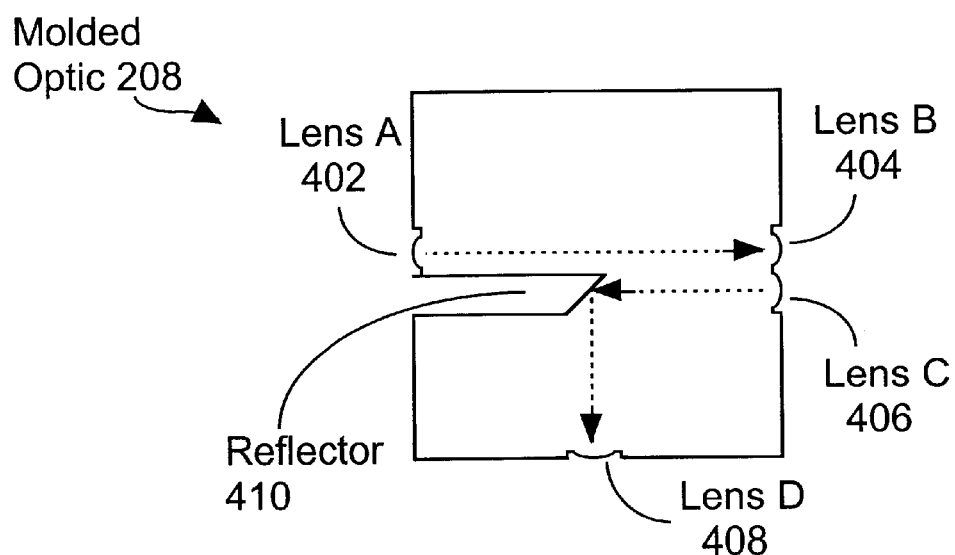
FIG. 5 depicts an embodiment of a molded optic in accordance with the present invention.

Referring to FIG. 5, there is shown an embodiment of the molded optic 208. It is to be understood that this Figure, as well as all the other figures are schematic figures, not drawn to scale, so as to show the approximate shape and location of the technically important features. Lens A 402, lens B 404, and lens C 406 are collimators. The light from the laser diode travels along a first axis, through the molded optic 208 from lens A 402 through lens B 404 onto the transmitting fiber. Lens A 402 approximately collimates the light from the laser diode along the first axis, while lens B 404 focuses the collimated, transmitted light onto the transmitting fiber 306 (FIG. 4).

The light from the receiving fiber is received by lens C 406, which approximately collimates the received light along a second axis. The second axis is parallel to the first axis along which the transmitted light travels. The received light, after being approximately collimated by lens C 406 is reflected by the reflector 410. The reflector 410, in the preferred embodiment, is based on total internal reflection. The reflector 410 is positioned and angled within the molded optic 208 so that it reflects the light perpendicularly towards lens D 408. Lens D 408 focuses the received, collimated light onto the photodiode 304 (FIG. 4). Lens D 408 is preferably larger than the other three lenses to correct for any imperfection in the redirection of the light by the reflector 410.

Alternative embodiments may include an optical assembly that is not a single molded piece. The four lenses and the reflector may each be separate components that are held in position as described above. Or, the two lenses that pass the light from the laser diode to the transmitting optical fiber may be a first molded piece while the other two lenses and the reflector may be a second molded piece.

In a preferred embodiment, the molded optic and its lenses are made from a high temperature plastic. In other embodiments the molded optic may be made from glass.

Figure 6:
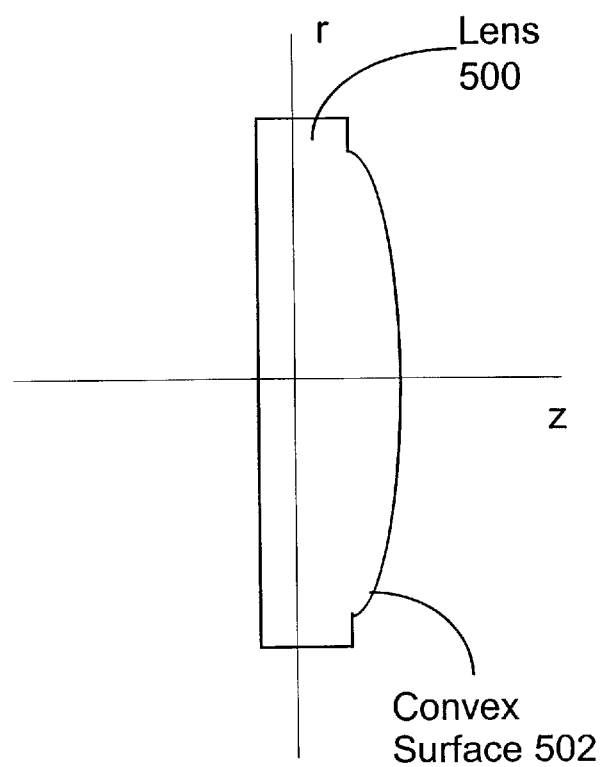
FIG. 6 depicts an illustrative embodiment of a lens and the 'r' and 'z' axes in accordance with the present invention.

Referring to FIG. 6, an embodiment of a lens 500 is shown. Lens 500 is representative of each of the lenses 402, 404, 406, 408 (FIG. 5) in the molded optic. The convex surface 502 of the lens 500 is known as an even order asphere. The even order asphere is defined by Equation 1:

$$z = \frac{cr^2}{1 + \sqrt{1 - (1 + k)c^2 r^2}} \quad \text{Eq. 1}$$

where 'z' is the sag coordinate and the 'r' is the radial coordinate of the surface 502 of the lens. As shown in FIG. 6, the z coordinate is the "height" of any point along convex surface 502, as measured from the bottom of the surface 502 along the z axis. The r coordinate is the distance from the z axis to the surface of the lens.

Figure 7:
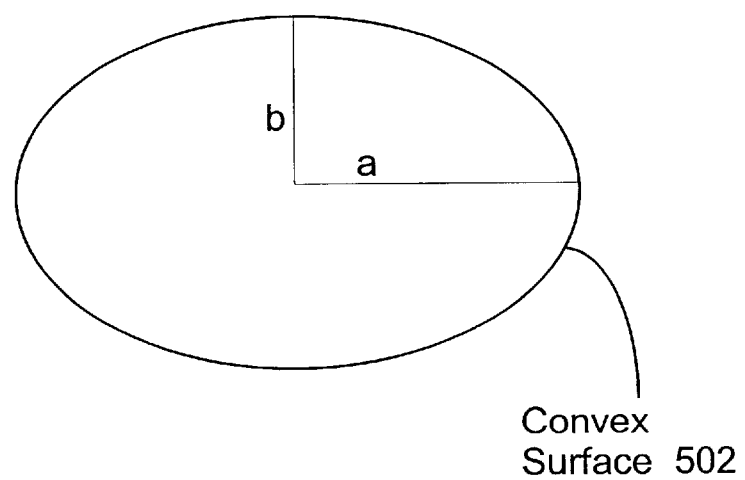
FIG. 7 depicts an illustrative embodiment of a lens and the 'a' and 'b' axes in accordance with the present invention.

Returning to Equation 1, 'c' represents the curvature of the aspherical surface 502. The surface of the even order asphere may be defined by an ellipse as shown in FIG. 7. When 'a' is the semi-major axis length of the ellipse, and 'b' is the semi-minor axis length of the ellipse, then "c" in Equation 1 is defined by $$\frac{1}{c} = \pm \frac{b^2}{a}.$$

The 'k' in Equation 1 is the conic constant and is defined by the following formula:

$$-\frac{a^2 - b^2}{a^2}.$$

Thus, the shape of each lens is defined by the k and c parameters, as well a range of r values that define the extent of the lens surface.

In the preferred embodiment, referring to FIG. 5, for lens A 402:
 k=−5.1286
 c=1.2918
 0<r≦0.3750;
for lens B 404:
 k=−1.9100
 c=1.6779
 0<r≦0.3750;
for lens C 406:
 k=−3.4154
 c=1.4981
 0<r≦0.3750; and
for lens D 408:
 k=−2.3468
 c=1.7241
 0<r≦0.5500.

Optical design programs such as ZEMAX (a trademark of Focus Software, Inc.) are used to determine these lens dimensions.

It is well known that reflections coupled back into a laser cavity cause fluctuations in both the amplitude and phase of the laser output. These fluctuations have several detrimental effects including increased relative intensity noise (RIN), increased spectral width, and increased mode partition noise (for multi-longitudinal mode lasers). In fiber optic communication systems each of these may have an adverse effect on system performance. The most notable manifestation is a reduction in fiber optic link length (i.e., the space between signal repeaters must be reduced to avoid loss of information). In some cases, however, the effects can be so profound as to prevent satisfactory performance altogether over even an arbitrarily short link.

Figure 8:
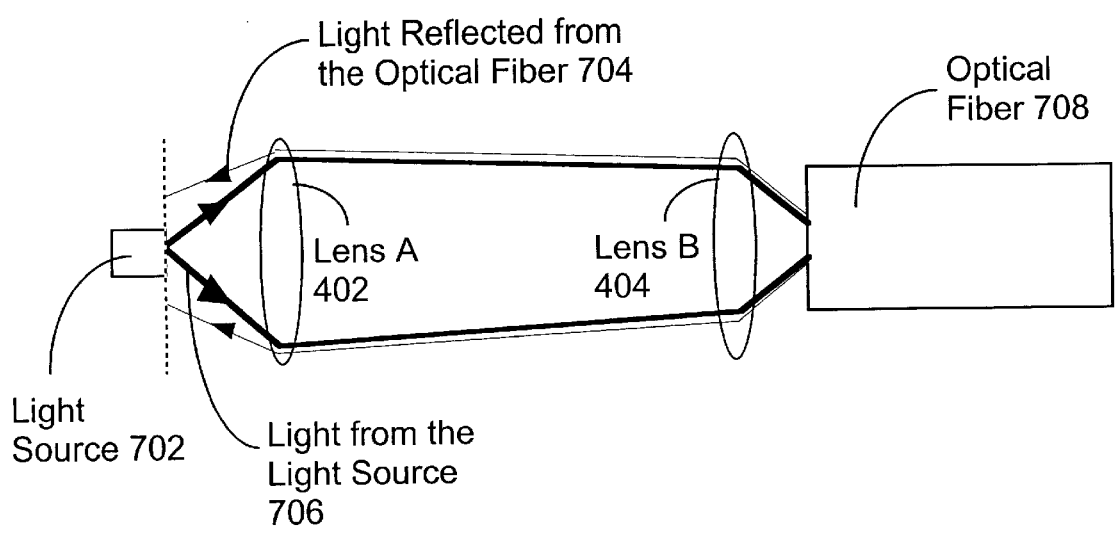
FIG. 8 depicts an embodiment of a light transmission optical assembly in accordance with the present invention.

Referring to FIG. 8, in a preferred embodiment of the present invention the lens combination of lens A 402 and lens B 404 does not focus the light 706 from the light source 702 onto a diffraction limited spot on the transmitting optical fiber 708. Lenses A and B are purposeful designed this way so that any light 704 that is reflected back from the optical fiber 708 onto the light source 702 is "defocused" and diffused over an area that is larger than the aperture of the laser diode light source 702. For example, in a preferred embodiment, lens A 402 and lens B 404 are designed to focus the light onto a spot, approximately 50 μm in diameter, on the optical fiber 708, while the light source 702 has a 20 μm aperture. As a result less than fifty (50) percent of the reflected light 704 is reflected back onto the light source 702, and in a preferred embodiment less than 25% of the reflected light 704 is reflected into the light source 702. This is especially advantageous when a laser diode is used as a light source because, as explained above, operation of the laser diode can be disrupted by light reflected back into the laser.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An optical assembly comprising:
   a first lens positioned along a first axis and configured to focus light from a first light source along said first axis;
   a second lens positioned along said first axis and configured to focus light from said first lens onto an optical target;
   a third lens positioned along a second axis and configured to focus light from a second light source along said second axis;
   a reflector positioned along said second axis, configured to reflect light from said third lens onto a fourth lens; and
   said fourth lens positioned on a third axis angled from said second axis and configured to focus light from said reflector onto an optical detector.

2. The optical assembly of claim 1, wherein the first lens, the second lens, the third lens, the reflector, and the fourth lens make up a single molded optic.

3. The optical assembly of claim 2, wherein the single molded optic is plastic.

4. The optical assembly of claim 1, wherein the first light source is a laser diode.

5. The optical assembly of claim 1, wherein the second light source is an optical fiber.

6. The optical assembly of claim 1, wherein the optical target is an optical fiber.

7. The optical assembly of claim 1, wherein the first axis is parallel to the second axis.

8. The optical assembly of claim 1, wherein the first axis is displaced approximately 0.75 mm from the second axis.

9. The optical assembly of claim 1, wherein the third axis is perpendicular to the second axis.

10. The optical assembly of claim 1, wherein the third axis is angled with respect to the second axis at an angle between 30 and 150 degrees.

11. The optical assembly of claim 1, wherein the optical target is larger than the first light source.

12. The optical assembly of claim 10, wherein a portion of the light focused on the optical target by the second lens is reflected back by the optical target, and the second lens focuses the light from the first lens onto a spot on the optical target larger than the light source such that less than 50% of the light reflected back by the optical target is absorbed by the light source.

13. The optical assembly of claim 1, wherein a portion of the light focused on the optical target by the second lens is reflected back by the optical target, and the first lens and second lens are configured such that less than 25% of the light reflected back by the optical target is absorbed by the light source.

14. The optical assembly of claim 13, wherein the third axis is perpendicular to the second axis.

15. The optical assembly of claim 14, wherein the optical target is an optical fiber and the first light source is a laser diode.

16. An optoelectronic transceiver comprising:
   an optical subassembly comprising:
      a light source; and
      an optical detector; and
   an optical assembly comprising:
      a first lens positioned along a first axis and configured to focus light from said light source along said first axis;
      a second lens positioned along said first axis and configured to focus light from said first lens onto an optical target;
      a third lens positioned along a second axis and configured to focus light from an optical fiber along said second axis;
      a reflector positioned along said second axis, configured to reflect light from said third lens onto a fourth lens;
      said fourth lens positioned on a third axis angled from said second axis and configured to focus light from said reflector onto said optical detector.

17. The optical transceiver of claim 16, wherein the optical assembly is a single molded optic.

18. The optical assembly of claim 17, wherein the single molded optic is plastic.

19. The optoelectronic transceiver of claim 16, wherein the light source is a laser diode.

20. The optoelectronic transceiver of claim 16, wherein the optical target is an optical fiber.

21. The optoelectronic transceiver of claim 16, wherein the first axis is parallel to the second axis.

22. The optoelectronic transceiver of claim 16, wherein the first axis is displaced approximately 0.75 mm from the second axis.

23. The optoelectronic transceiver of claim 16, wherein the third axis is perpendicular to the second axis.

24. The optoelectronic transceiver of claim 16, wherein the optical target is larger than the first light source.

25. The optoelectronic transceiver of claim 24, wherein the second lens focuses the light from the first lens onto a spot on the optical target larger than the light source such that less than 50% of the light reflected back by the optical target is absorbed by the light source.

26. An optical assembly comprising a single molded optic component having a first optical path positioned along a first axis for transmitting and focusing light from a first light source onto a first target and having a second optical path that is bent by a single reflector, the second optical path having a first portion positioned along a second axis parallel to and displaced from the first axis and having a second portion positioned on a third axis angled from said second axis, the second optical path for transmitting and focusing light from a second light source onto a second target.

27. The optical assembly of claim 26, wherein the single molded optic component is plastic.

28. The optical assembly of claim 27, wherein the single molded optic component is configured for use in a device wherein the first light source is a laser diode, the first target is a first optical fiber, the second optical source is a second optical fiber and the second target is a photodiode.

29. The optoelectronic transceiver of claim 27, wherein the first axis is displaced approximately 0.75 mm from the second axis.

30. The optoelectronic transceiver of claim 26, wherein the first axis is displaced approximately 0.75 mm from the second axis.

31. The optoelectronic transceiver of claim 30, wherein the third axis is perpendicular to the second axis.

32. The optoelectronic transceiver of claim 26, wherein the first optical path is configured to defocus light reflected back by the first target toward the first light source such that less than 50% of the light reflected back by the first target is absorbed by the first light source.

33. The optoelectronic transceiver of claim 26, wherein the first optical path is configured to defocus light reflected back by the first target toward the first light source such that less than 25% of the light reflected back by the first target is absorbed by the first light source.

* * * * *